(12) United States Patent
Wawro

(10) Patent No.: US 9,364,934 B2
(45) Date of Patent: Jun. 14, 2016

(54) CLAMPING DEVICE

(71) Applicant: Ryszard Wawro, Lindenhurst, NY (US)

(72) Inventor: Ryszard Wawro, Lindenhurst, NY (US)

( * ) Notice: Subject to any disclaimer, the term of this patent is extended or adjusted under 35 U.S.C. 154(b) by 174 days.

(21) Appl. No.: 14/299,708

(22) Filed: Jun. 9, 2014

(65) Prior Publication Data

US 2014/0363252 A1     Dec. 11, 2014

Related U.S. Application Data

(60) Provisional application No. 61/832,895, filed on Jun. 9, 2013.

(51) Int. Cl.
  *B23Q 3/10* (2006.01)
  *B23Q 3/06* (2006.01)
  *B25B 5/10* (2006.01)

(52) U.S. Cl.
  CPC ....... *B23Q 3/103* (2013.01); *B23Q 3/06* (2013.01); *B25B 5/10* (2013.01); *Y10T 409/309016* (2015.01)

(58) Field of Classification Search
  CPC ............ B25B 5/08; B25B 5/102; B25B 5/16; B25B 5/02; B25B 1/02; B25B 11/02
  See application file for complete search history.

(56) References Cited

U.S. PATENT DOCUMENTS

| | | | | |
|---|---|---|---|---|
| 1,490,063 A * | 4/1924 | Tower | ............... | B25B 5/108 269/211 |
| 2,882,656 A * | 4/1959 | Novkov | ............... | B25B 1/103 269/258 |
| 2,969,817 A * | 1/1961 | Zabich | ............... | B25B 5/10 144/307 |
| 4,108,589 A * | 8/1978 | Bunch | ............... | B21D 19/046 269/228 |
| 5,735,513 A * | 4/1998 | Toffolon | ............... | B25B 1/08 269/138 |
| 5,816,568 A * | 10/1998 | Fox | ............... | B25B 5/14 269/111 |
| 7,044,460 B2 * | 5/2006 | Bolton | ............... | B25B 23/00 269/37 |
| 8,167,292 B1 * | 5/2012 | Mucciacciaro | ....... | B25B 1/2405 269/262 |
| 8,210,510 B2 * | 7/2012 | Li | ............... | B25B 1/103 269/246 |
| 8,387,222 B2 * | 3/2013 | Chen | ............... | B25B 27/02 269/314 |
| 2014/0363252 A1 * | 12/2014 | Wawro | ............... | B23Q 3/06 409/225 |

* cited by examiner

*Primary Examiner* — Lee D Wilson
(74) *Attorney, Agent, or Firm* — The Farrell Law Firm, P.C.

(57) ABSTRACT

An apparatus for clamping a work piece is provided. The apparatus includes a base plate to support the work piece; at least one clamp body fixed to the base plate, each clamp body having a hole that receives a corresponding screw, wherein the hole passes through the clamp body such that as the clamp screw is inserted through the clamp body an end of a body of the screw moves horizontally towards the work piece supported by the base plate at a downward angle; fastener fixing the at least one clamp body to the base plate; and the at least one corresponding screw, each screw having a hollow point tip where outer and inner lateral surfaces of the hollow point tip join to define a sharp circular edge at an end of a body of the screw.

16 Claims, 4 Drawing Sheets

CLAMPING DEVICE

PRIORITY

This application claims priority under 35 U.S.C. §119(a) to a U.S. Provisional Application filed in the United States Patent and Trademark Office on Jun. 9, 2013 and assigned Ser. No. 61/832,895, the entire content of which is incorporated herein by reference.

BACKGROUND

1. Field of the Invention

The present invention generally relates to an apparatus, and more particularly, to an apparatus for clamping a work piece.

2. Description of the Related Art

When using a milling machine with a clamped work piece, a typical clamp may be limited to being used with only certain types of work piece materials, and is limited in its ability to accurately and firmly holding the work piece in place.

SUMMARY OF THE INVENTION

The present invention has been made to address at least the above problems and/or disadvantages and to provide at least the advantages described below. Accordingly, an aspect of the present invention is to provide an apparatus to prevent relative movement of the work piece during the machining process, which helps to efficiently use the milling power of the machine and to achieve better security and accuracy.

According to an aspect of the present invention, an apparatus for clamping a work piece is provided. The apparatus includes a base plate to support the work piece; at least one clamp body fixed to the base plate, each clamp body having a hole that receives a corresponding screw, wherein the hole passes through the clamp body such that as the clamp screw is inserted through the clamp body an end of a body of the screw moves horizontally towards the work piece supported by the base plate at a downward angle; fastener fixing the at least one clamp body to the base plate; and the at least one corresponding screw, each screw having a hollow point tip where outer and inner lateral surfaces of the hollow point tip join to define a sharp circular edge at an end of a body of the screw.

According to another aspect of the present invention, an apparatus for clamping a work piece is provided. The apparatus includes a clamp body having a hole passing through the work body that receives a screw; fastener fixing the clamp body to a base plate that supports the work piece; and the screw having a hollow point tip, where outer and inner lateral surfaces of the hollow point tip join to define a sharp circular edge at an end of a body of the screw, wherein the hole passes through the clamp body such that as the clamp screw is inserted through the clamp body an end of a body of the screw moves horizontally towards the work piece supported by the base plate at a downward angle.

According to another aspect of the present invention, an apparatus for clamping a work piece is provided. The apparatus includes a clamp body having a hole passing through the work body that receives a screw; the screw having a hollowed end of a body of the screw; fastener fixing the clamp body to a base plate that supports the work piece; and a plunging piece having one end inserted into the hollowed end of the screw and a hollow point tip at an opposite end of the plunging piece, where outer and inner lateral surfaces of the hollow point tip join to define a circular sharp edge at the opposite end of the plunging tip, wherein the hole passes through the clamp body such that as the clamp screw is inserted through the clamp body an end of a body of the screw moves horizontally towards the work piece supported by the base plate at a downward angle.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
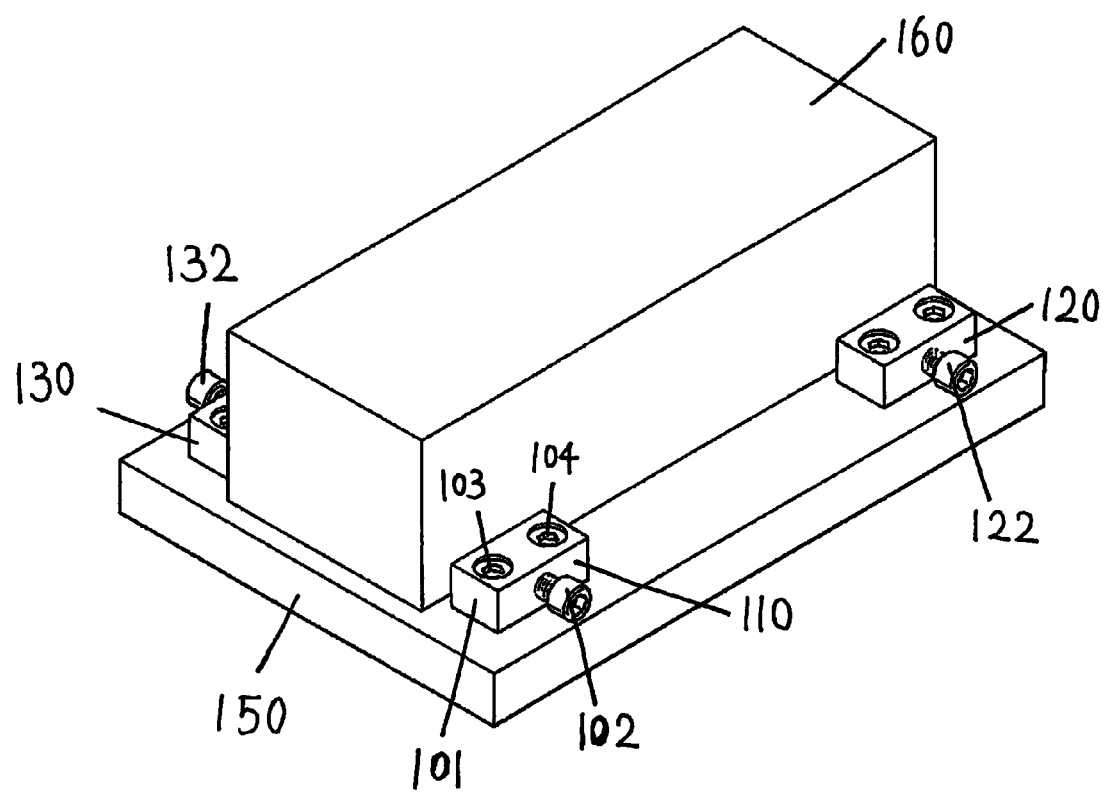
FIG. 1 is a diagram illustrating a general view of an apparatus for clamping a work piece according to an embodiment of the present invention.

Hereinafter, embodiments of the present invention will be described in detail with reference to the accompanying drawings. In the description herein, well-known functions and structures which may unnecessarily obscure the subject matter of the present invention may be omitted. The following description includes various specific details to assist in that understanding but these are to be regarded as mere examples. Accordingly, those of ordinary skill in the art will recognize that various changes and modifications of the various embodiments described herein can be made without departing from the scope and spirit of the present invention. Throughout the drawings, like reference numerals may be used to refer to like parts, components, and structures.

FIG. 1 is a diagram illustrating a general view of an apparatus for clamping a work piece according to an embodiment of the present invention.

Referring to FIG. 1, an apparatus for clamping a work piece 160 includes four clamping sets of clamp bodies and screws, including sets 110, 120, 130, and a fourth set (not shown). As shown in FIG. 1, two sets 110 and 120 are located near opposite ends of a right side of the work piece 160. Similarly, a third set 130 is located near an end of a left side of the work piece 160, and the fourth set is located near the other end of the left side of the work piece 160 at a location opposite the second set 120. The apparatus further includes a base plate 150.

The base plate 150 is used to support the work piece 160. The four sets of clamp bodies and screws (i.e., first through third sets 110, 120, and 130, and the fourth set) are fixed to the base plate 150 and supported by the base plate 150. In the present embodiment, each set of clamp body and screw is removably attached to the base plate, but fixed sets may also be used in accordance with embodiments of the present invention.

The first set 110 includes a clamp body 101 and a screw 102. The clamp body 101 has two vertical holes to receive corresponding fasteners 103 and 104. The two fasteners 103 and 104 may be screws or other means used to fix the clamp body 101 to the base plate 150. The screw 102 passes through the clamp body 101 through a horizontal hole in the clamp body 101 and reaches the work piece 160. The screw 102 has a hollow point tip made of a hardened material. When clamping, the hollow point tip contacts the work piece and generates a force pressing the hollow point tip against the work piece.

Each of the other sets of clamp bodies and screws, (i.e., sets 120, 130, and the fourth set) has a structure and configuration similar to that of set 110. When the screw 102 of the first set 110 and the screw 132 of the third set 130 are driven together towards the work piece 160, the hollow point tips of the two opposite screws 102 and 132 clamp the work piece 160 and generate a force that holds the work piece 160 at one end of the work piece 160. Similarly, when the screw 122 of the second set 120 and the screw of the fourth set (not shown) are driven to towards the work body 160, the hollow point tips of the two opposite screws clamp the work piece 160 and generate a force that holds the work piece 160 at the opposite end of the work piece 160.

Although four sets of clamp bodies and screws are illustrated in FIG. 1, the apparatus for clamping the work piece may contain one or more sets of clamp bodies and screws. The arrangement of the sets of clamp bodies and screws are not limited to the configuration illustrated in FIG. 1, including placing the sets at any location where a screw of the may apply pressure to secure a work piece.

Although two fasteners inserted through two holes in the clamp body are described here as means for fixing the clamp body to the base plate, the means for fixing the clamp body to the base plate is not limited thereto, and any quantity or type of fastener may be used in accordance with embodiments of the present invention.

As shown in FIG. 1, fasteners 103 and 104 have diameters corresponding to the diameter of the holes in the clamp body 101, such that, when the fasteners 103 and 104 are inserted in the clamp body, the clamp body is not movable with respect to the base 150.

Although two vertical holes and one horizontal hole (e.g., with respect to set 101, holes 103 and 104 and the hole for receiving screw 102) are shown and described with respect to each clamp body of FIG. 1, the direction of each hole and the arrangement of the holes are not limited thereto.

Figure 2:
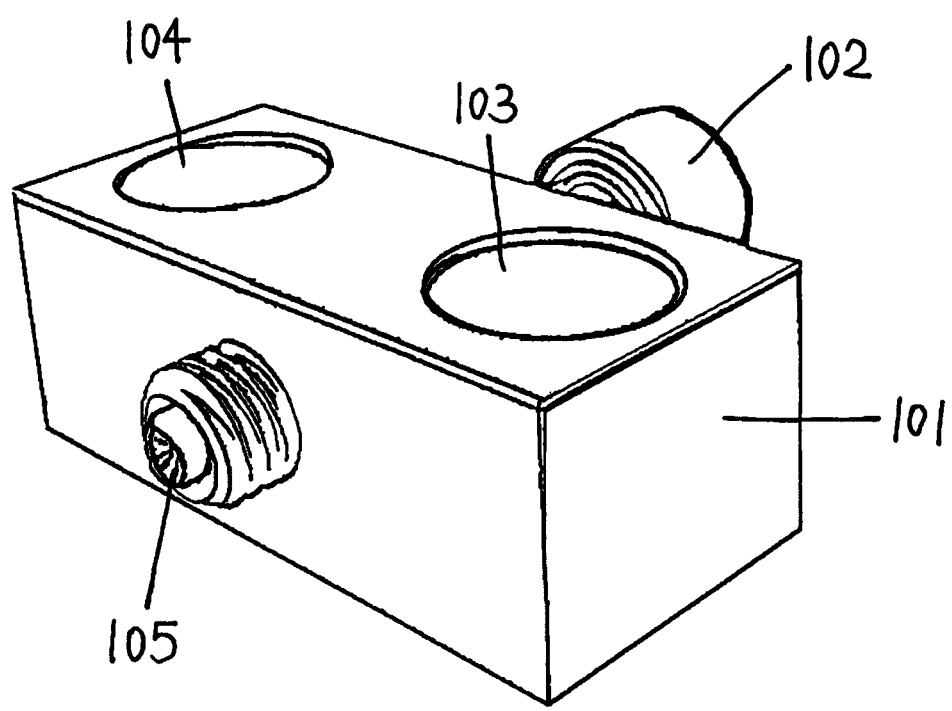
FIG. 2 is a diagram illustrating an angled side view of a clamp body having a hole that receives a corresponding screw with a hollow point tip according to an embodiment of the present invention.

FIG. 2 is a diagram illustrating an angled side view of a clamp body having a hole that receives a corresponding screw with a hollow point tip according to an embodiment of the present invention.

Referring to FIG. 2, the screw 102 passing through the clamp body 101 has a hollow point tip 105. The hollow point tip 105 may be integrally formed as a part of the screw 102, that is, the screw 102 has an end in a same shape as that of a hollow point bullet. Alternatively, the hollow point tip 106 may be formed as a separate piece from a body of the screw and inserted into a hollowed end of the screw, as described in further detail herein with reference to FIGS. 3A and 3B.

Figure 3A:
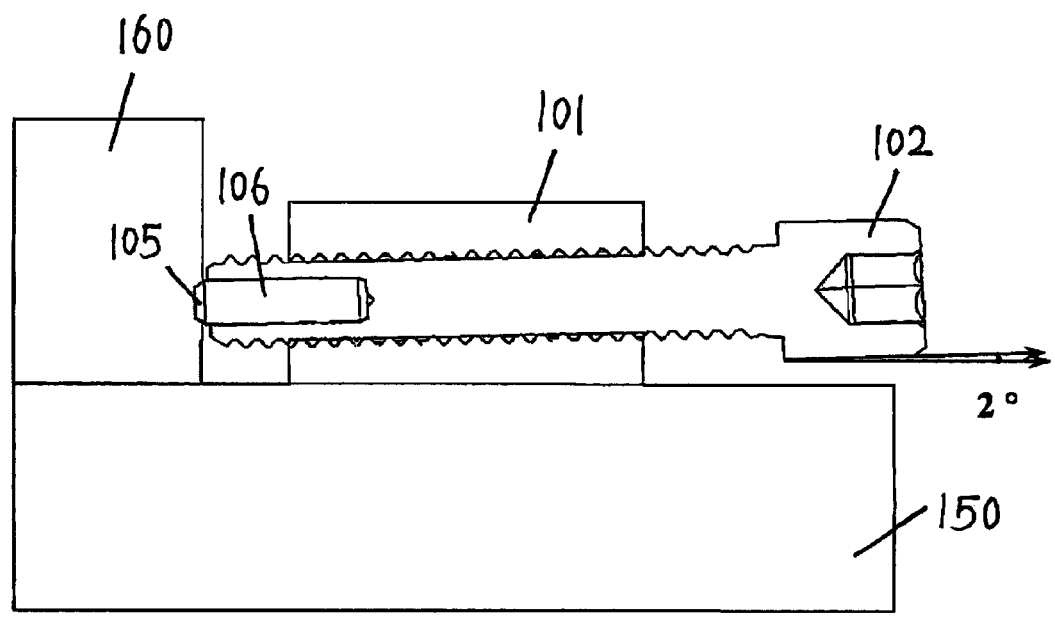
FIG. 3A is a diagram illustrating a cross-sectional view of an apparatus for clamping a work piece according to an embodiment of the present invention.
Figure 3B:
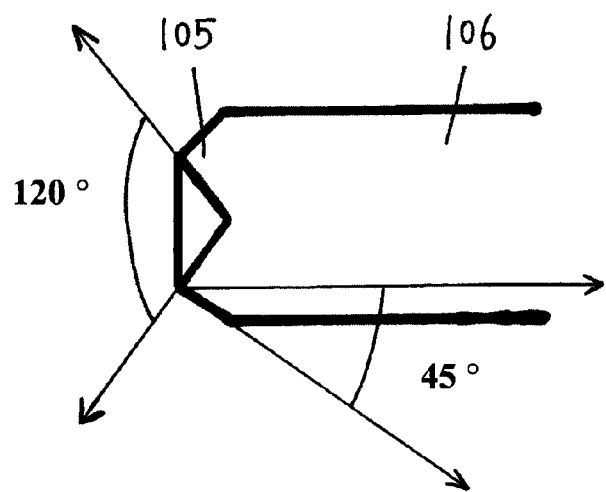
FIG. 3B is a diagram illustrating a cross-sectional view of a hollow point tip of a plunging piece according to an embodiment of the present invention.

FIG. 3A is a diagram illustrating a cross-sectional view of an apparatus for clamping a work piece according to an embodiment of the present invention. FIG. 3B is a diagram illustrating a cross-sectional view of a hollow point tip of a plunging piece according to an embodiment of the present invention.

Referring to FIGS. 3A and 3B, the screw 102 passing through the clamp body 101 has a hollowed end, and one end of a plunging piece 106 is inserted into the hollowed end of the screw 102. The other end of the plunging piece 106 is a hollow point tip 105, which is pressed into the work piece 160 to clamp the work piece 160.

The hollow point tip 105 has outer lateral surface and inner lateral surface. The outer lateral surface and inner lateral surface join together at a circular sharp edge. In the present example, the outer lateral surface is defined by a lateral surface of a frustum of a right circular cone. In the present example, the outer lateral surface forms a 45 degree angle with respect to the moving direction of the screw. As another example, the inner lateral surface forms a hollow in a shape of a right circular cone and is defined by a lateral surface of the right circular cone. In the present example, the inner lateral surface forms a hollow in a shape of a right circular cone with a 120 degree aperture. Although defined as above, the shapes of the outer and inner lateral surfaces, as well as the angles formed by the outer and inner later surfaces are not limited to the above examples, and other shapes and angles may be used in accordance with embodiments of the present invention.

In the present example, the screw 102 moves horizontally toward the work piece 160 through the hole in the clamp body at a downward angle. That is, the moving direction of the screw 102 is angled slightly downward with respect to the horizontal plane provided by the base plate, such as at a downward angle of 2 degrees. However, other angles may be used in accordance with embodiments of the present invention.

The plunging piece is made of a hardened material. For optimal clamping, the hardened material is hardened to 60 Rockwell C (RC) scale. Use of a separate plunging piece inserted in the screw allows the plunging piece to be formed of a greater variety of materials and hardness than that used in forming the body of the screw.

In the present example, the main body of the plunging piece is in a shape of a right circular cylinder, but other shapes may be used in accordance with embodiments of the present invention.

Figure 4:
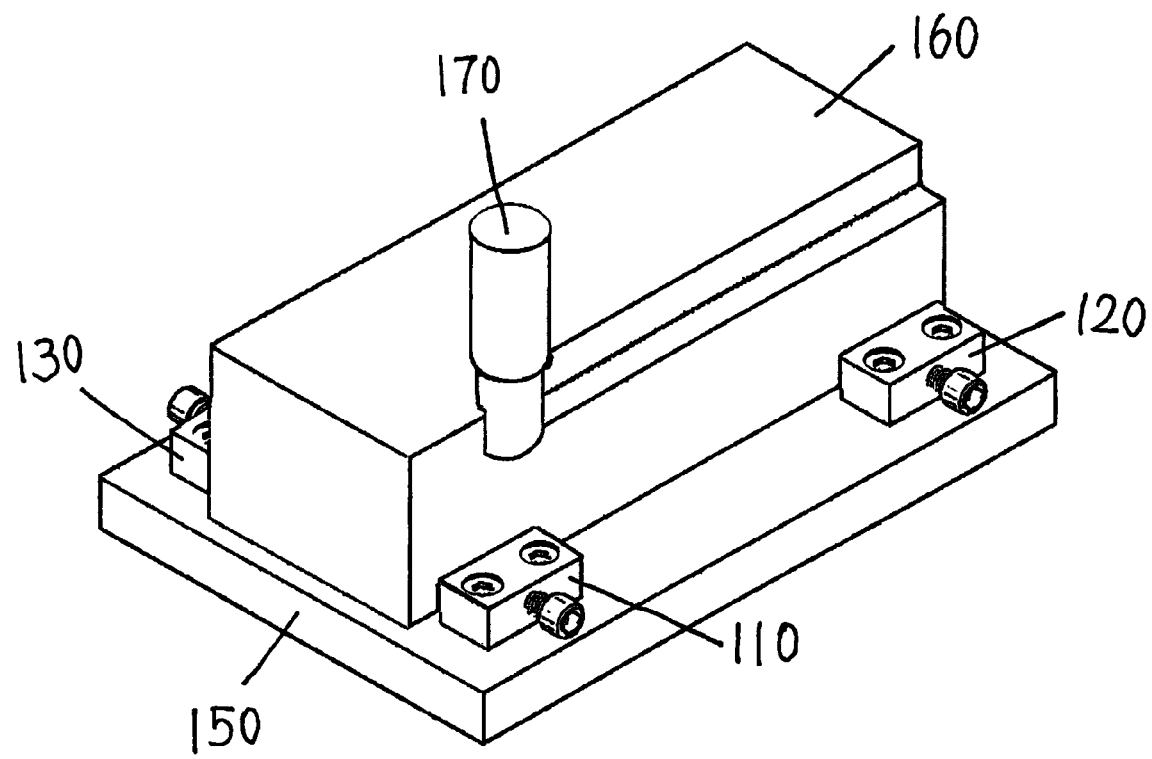
FIG. 4 is a diagram illustrating a general view of operating an apparatus for clamping a work piece according to an embodiment of the present invention.

FIG. 4 is a diagram illustrating a general view of operating an apparatus for clamping a work piece according to an embodiment of the present invention.

Referring to FIG. 4, when the apparatus for clamping a work piece is used, the four sets of the clamp bodies and screws (i.e., first through third sets 110, 120, and 130, and the fourth set (not shown)) function together to clamp down the work piece 170. The end mill 170 of a milling machine (e.g., a Numerical Control (NC) milling machine) operates on the work piece 160 for NC milling machining. This apparatus provides an efficient, convenient, safe and inexpensive way to strongly clamp down any work material to the base plate for NC milling machining.

As illustrated below, examples of parameters of the apparatus for clamping a work piece are provided. Referring to TABLE 1, three sizes of screws that may be used in apparatus for clamping a work piece in accordance with embodiments of the present invention are listed with the corresponding gripping force and travel range.

TABLE 1

| SCREW size (inches) | GRIPPING force (@1700 lb-in) | TRAVEL range (inches) |
|---|---|---|
| ½ - 13 | 8 ton | ½" |
| ⅝ - 11 | 12 ton | ⅝" |
| ¾ - 10 | 17 ton | ⅝" |

An apparatus according to embodiments of the present invention prevents relative movement of the work piece during the machining process, which helps to efficiently use the milling power of the machine and to achieve better security and accuracy.

An apparatus according to embodiments of the present invention can be used with any NC machineable material (e.g., aluminum, steel, titanium), forged or not, and not necessarily previously milled, thereby reducing preparation costs.

An apparatus according to embodiments of the present invention provides a stronger clamping force than that of other options currently available on the market.

An apparatus according to embodiments of the present invention provides a greater travel range than that of other options currently available on the market, allowing for machining to be done on forged work blocks, if necessary, and on work blocks that are not previously milled.

An apparatus according to embodiments of the present invention allows for greater tolerances (e.g., size, shape, and parallelism) in the material being clamped, while still accurately and firmly holding the material in place. For example, an apparatus according to an embodiment of the present invention can be used with a work block that is not perfectly shaped or perfectly paralleled, while still achieving a strong grip.

While the present invention has been particularly shown and described with reference to certain embodiments thereof, various changes in form and detail may be made therein without departing from the spirit and scope of the present invention as defined by the following claims. Accordingly, the scope of the present invention will be defined by the appended claims and equivalents thereto.

What is claimed is:

1. An apparatus for clamping a work piece, the apparatus comprising:
    a base plate to support the work piece;
    at least one clamp body fixed to the base plate, each clamp body having a hole that receives a corresponding screw, wherein the hole passes through the clamp body such that, as the screw is inserted through the clamp body, an end of a body of the screw moves horizontally towards the work piece supported by the base plate at a downward angle;
    at least one fastener fixing the at least one clamp body to the base plate; and
    the at least one corresponding screw, each screw having a hollow point tip where outer and inner lateral surfaces of the hollow point tip join to define a sharp circular edge at an end of a body of the screw.

2. The apparatus of claim 1, wherein the at least one clamp body comprises:
    two clamp bodies arranged at a left side of the work piece supported by the base plate; and
    two clamp bodies arranged at a right side of the work piece opposite the two clamp bodies at the left side.

3. The apparatus of claim 1, wherein the clamp body is removably attached to the base plate.

4. An apparatus for clamping a work piece, the apparatus comprising:
    a clamp body having a hole passing through the work body that receives a screw;
    at least one fastener fixing the clamp body to a base plate that supports the work piece; and
    the screw having a hollow point tip, where outer and inner lateral surfaces of the hollow point tip join to define a sharp circular edge at an end of a body of the screw,
    wherein the hole passes through the clamp body such that, as the screw is inserted through the clamp body, an end of a body of the screw moves horizontally towards the work piece supported by the base plate at a downward angle.

5. An apparatus for clamping a work piece, the apparatus comprising:
    a clamp body having a first hole passing through the work body that receives a screw;
    the screw having a hollowed end of a body of the screw;
    at least one fastener one fastener fixing the clamp body to a base plate that supports the work piece; and
    a plunging piece having one end inserted into the hollowed end of the screw and a hollow point tip at an opposite end of the plunging piece, where outer and inner lateral surfaces of the hollow point tip join to define a circular sharp edge at the opposite end of the plunging tip,
    wherein the first hole passes through the clamp body such that, as the screw is inserted through the clamp body, an end of a body of the screw moves horizontally towards the work piece supported by the base plate at a downward angle.

6. The apparatus of claim 5, wherein a main body of the plunging piece is in a shape of a right circular cylinder.

7. The apparatus of claim 5, wherein the outer lateral surface of the hollow point tip is defined by a lateral surface of a frustum of a right circular cone.

8. The apparatus of claim 7, wherein the outer lateral surface of the hollow point tip forms a 45 degree angle with respect to a central axis of the screw.

9. The apparatus of claim 5, wherein the inner lateral surface of the hollow point tip forms a hollow in a shape of a right circular cone and is defined by a lateral surface of the right circular cone.

10. The apparatus of claim 9, the inner lateral surface of the hollow point tip forms the hollow in the shape of the right circular cone with a 120 degree aperture.

11. The apparatus of claim 5, wherein the plunging piece is made of a hardened material.

12. The apparatus of claim 11, wherein the hardened material is hardened to 60 Rockwell C (RC) scale.

13. The apparatus of claim 5, wherein the downward angle is 2 degrees.

14. The apparatus of claim 5, wherein the at least one fastener fixing the clamp body to the base plate comprises two fasteners inserted through a second hole and a third hole in the clamp body, wherein lateral surfaces of the fasteners have a circumference corresponding to a circumference of the second hole and third hole.

15. The apparatus of claim 14, wherein the second hole and the third hole are approximately perpendicular to the first hole.

16. The apparatus of claim 15, wherein the fasteners are screws.

* * * * *